United States Patent
Siegel et al.

(10) Patent No.: US 6,276,909 B1
(45) Date of Patent: Aug. 21, 2001

(54) PISTON PUMP FOR A HYDRAULIC BRAKE SYSTEM OF A VEHICLE

(75) Inventors: Heinz Siegel, Stuttgart; Dieter Merklein; Joachim Ehrlich, both of Kempten; Andreas Weh, Durach; Michael Hellebrandt, Burgberg; Tobias Fluck, Immenstadt; Michael Schlitzkus, Dietmannsried, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,670

(22) PCT Filed: Jul. 8, 1998

(86) PCT No.: PCT/DE98/01889

§ 371 Date: Jun. 1, 1999

§ 102(e) Date: Jun. 1, 1999

(87) PCT Pub. No.: WO99/06703

PCT Pub. Date: Feb. 11, 1999

(30) Foreign Application Priority Data

Jul. 30, 1997 (DE) .............................................. 197 32 811

(51) Int. Cl.[7] ..................................................... F04B 53/12
(52) U.S. Cl. .......................... 417/549; 417/470; 92/170.1
(58) Field of Search ..................................... 417/470, 549; 92/168, 170.1; 277/557

(56) References Cited

U.S. PATENT DOCUMENTS

| | | | |
|---|---|---|---|
| 2,093,062 | * 9/1937 | Watson | 277/557 |
| 4,315,454 | * 2/1982 | Knödel | 92/170.1 |
| 4,867,043 | * 9/1989 | Antkowiak | 92/170.1 X |
| 5,746,111 | * 5/1998 | Mueller et al. | 92/168 |
| 5,823,639 | * 10/1998 | Zinnkann et al. | 417/549 X |
| 5,897,303 | * 4/1999 | Muller | 417/549 |
| 6,079,961 | * 6/2000 | Schuller et al. | 417/549 |
| 6,161,466 | * 12/2000 | Schuller et al. | 417/549 X |

* cited by examiner

Primary Examiner—Timothy S. Thorpe
Assistant Examiner—David J. Torrente
(74) Attorney, Agent, or Firm—Ronald E. Greigg; Edwin E. Greigg

(57) ABSTRACT

A piston pump for a hydraulic brake system for a vehicle with a slip control system. For economical production, the piston pump includes a piston as a composites part with a core of steel that is surrounded by a lubricant jacket of plastic. By way of example, the lubricant jacket is applied to the core by spray-coating, or is pressed onto the core or slipped onto the core. The lubricant jacket economizes by dispensing with expensive post-machining of the piston surface by grinding, for instance, and improves the sliding properties of the piston.

20 Claims, 3 Drawing Sheets

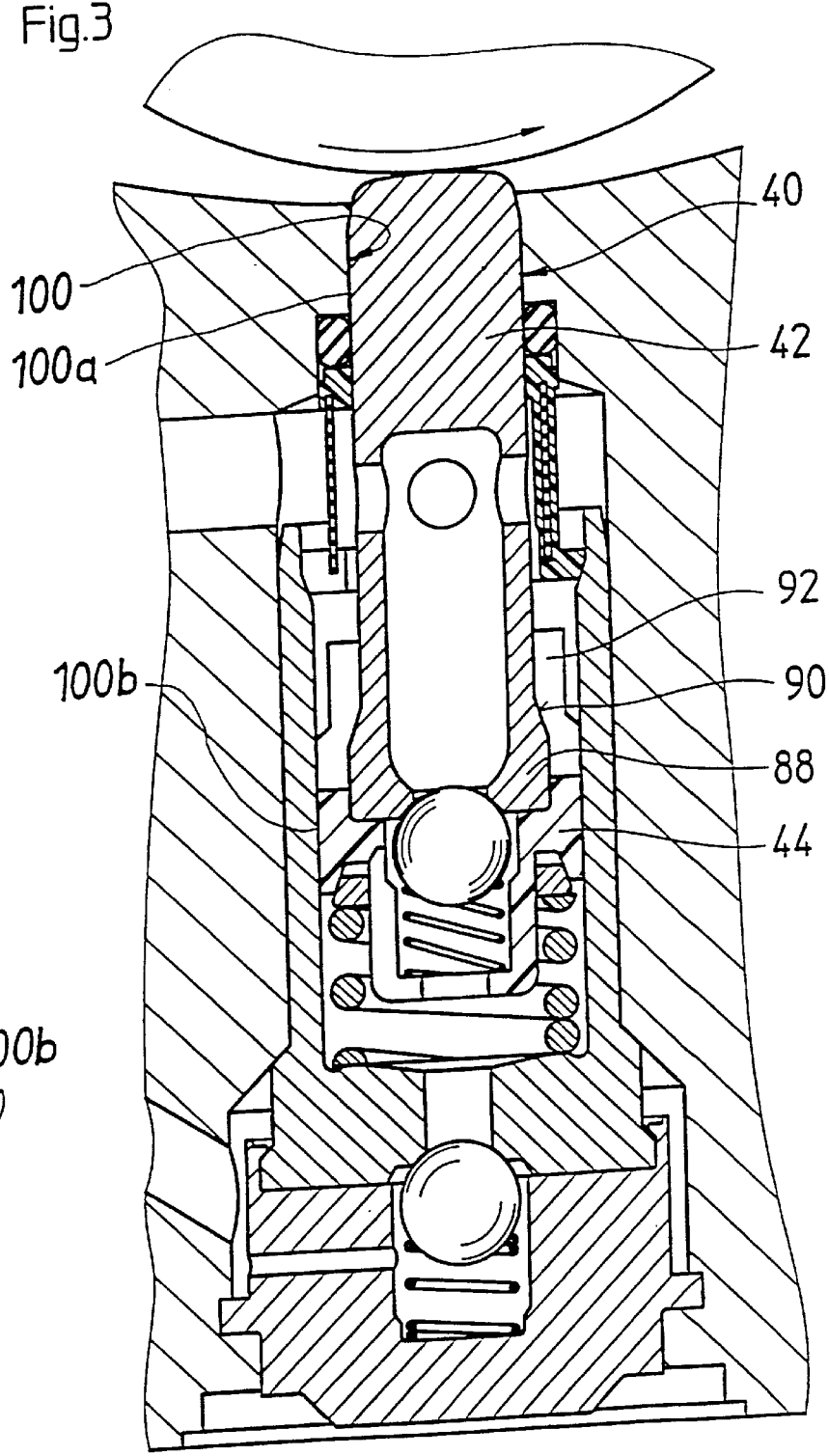
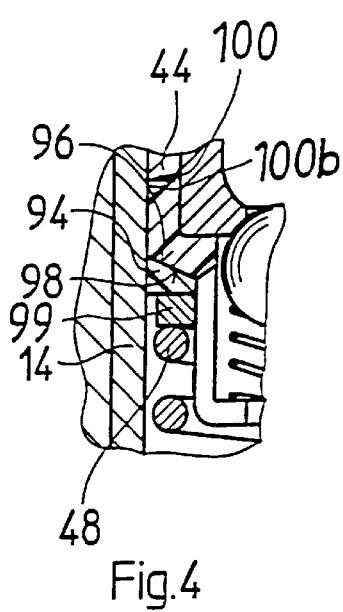
Fig.3
Fig.4

PISTON PUMP FOR A HYDRAULIC BRAKE SYSTEM OF A VEHICLE

PRIOR ART

The invention is based on a piston pump intended in particular for a hydraulic brake system for a vehicle with a slip control system.

One such piston pump is known for instance from German Patent Disclosure DE 41 07 979 A1. This known piston pump has a pump housing with a cylinder bore in which a piston is axially displaceably received. By means of an eccentric drive, the piston can be driven to execute an axially reciprocating stroke motion. The piston of the known piston pump is a workpiece produced by complicated and expensive metal cutting and drilling in graduated form.

ADVANTAGES OF THE INVENTION

The piston of the piston pumps according to the invention the characteristics of claim 1 has a core, for instance of steel, which is provided with a lubricant jacket of plastic on its circumference. A needle of a needle bearing can for instance be used as the core. The lubricant jacket need not cover the axial length of the core; a lubricant jacket in the region of one end of the core suffices, for instance. Two lubricant jackets may also be provided, in the region of both ends of the core. The invention has the advantage that the piston can be produced without metal-cutting machining and thus quickly and inexpensively. By means of the lubricant jacket of plastic, the piston has good sliding properties in the cylinder bore. Post machining of the piston circumference, forming a slide face, for instance by grinding is unnecessary. The core can also be produced by deforming, for instance cold forming, for instance by extrusion, flow turning or upsetting.

Because of the nonmetallic lubricant jacket, an otherwise usual guide ring for guiding the piston can be dispensed with without fear that increased friction or damage to the guide face will occur. By the omission of a guide ring, the expense for assembling the piston pump is advantaceously reduced substantially, and at the same time very good durability and high efficiency of the piston pump are nevertheless assured.

It can be provided that the core rests on an eccentric element. The core, which is of hard material and preferably hardened steel, has the advantage that the drive energy from the eccentric element can thus be transmitted to the piston without functional problems or wear problems.

The core also has the advantage that undesirably great accumulations of material at the lubricant jacket can be avoided.

The piston may be designed such that the piston is not guided at the core, which has the advantage that labor-intensive grinding of the core can be dispensed with. However, the piston can also be designed such that the guidance of the piston is done directly at the core, only in that region of the piston where it is easy to achieve the required surface quality.

If the piston is guided at least in some points directly on the core of the piston, then the requisite surface quality can be produced on the core before the lubricant jacket is applied to the core of the piston. This has the advantage that the requisite surface quality can be produced on the core without a major effort.

It may be provided that the lubricant jacket also serves to provide sealing between the piston and the piston guide. This has the advantage that a sealing ring can be omitted.

With the lubricant jacket, it is advantageously possible at no additional effort to produce a stepped piston, in which one end of the piston has a larger diameter than the other end.

In a preferred feature defined herein; the lubricant jacket is embodied as a sealing element at the same time. As a result, a separate sealing element, such as a sealing ring, is omitted, and it becomes unnecessary to make a groove in the piston or in a wall of the cylinder bore for receiving the sealing element. The step of inserting the sealing element into the groove is also dispensed with in the assembly of the piston pump.

In a refinement of the invention, the plastic lubricant jacket continues past a face end of the core and has a valve chamber into which a check valve is inserted as an inlet or outlet valve of the piston pump of the invention.

The retaining face proposed has the advantage that a durable connection between the core and the lubricant jacket is assured.

The retaining face can be designed in a very simple way such that the lubricant jacket and the core can be put together, and the retaining face advantageously assures a durable connection between the core and the lubricant jacket.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). The pump is needed in a brake system with wheel slip control (ABS or ASR) and/or a brake system serving as a steering aid (FDR) and/or an electrohydraulic brake system (EHB). With wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FER), a brake pressure is built up in one or more wheel brake cylinders independently of an actuation of the brake pedal or gas pedal, for instance to prevent the vehicle from breaking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWINGS

The invention will be described in further detail below in terms of preferred selected exemplary embodiments shown in the drawing. Shown are:

FIG. 3, an axial section through a modified embodiment of the piston pump of FIG. 2; and FIG. 4, a detail indicated by the arrow IV in FIG. 2 in a modified embodiment.

DESCRIPTION OF THE FIRST EXEMPLARY EMBODIMENT

Figure 1:
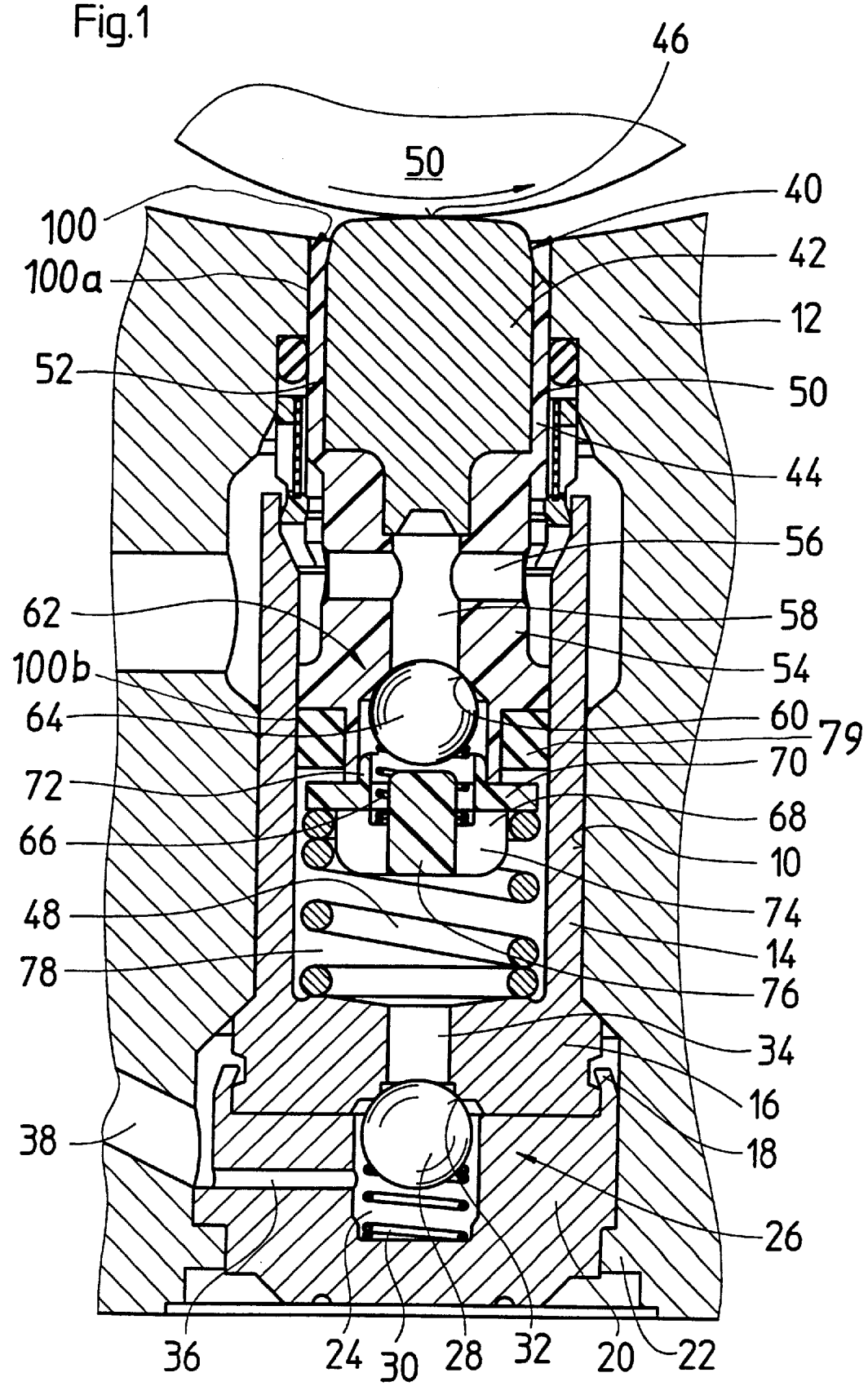
FIG. 1, an axial section through a piston pump of the invention.

The piston pump of the invention shown in FIG. 1 is inserted into a cylinder bore 10 in a pump housing 12, which is formed by a hydraulic block of a vehicle brake system not otherwise shown. Other hydraulic components, such as magnet valves and the like, are inserted into the hydraulic block and hydraulically connected to one another and to the piston pump; of the hydraulic block, for the sake of simplicity, only a fragment surrounding the piston pump has been shown.

The piston pump has a bush 14, with a bush bottom 16 integral with it that is press-fitted into the cylinder bore 10. By means of a crimp 18, a cylindrical stopper plug 20 is mounted on the bush bottom 16; by means of caulking 22, it closes one end of the cylinder bore 10 in pressure-tight fashion. A check valve in the form of an outlet valve 26 is inserted into a blind bore 24 of the plug 20, and this outlet valve has as its valve closing body a valve ball 28, which is pressed by a helical compression spring, as the valve closing spring 30, against a conical valve seat 32 that is embodied at an orifice of an axial through bore 34 in the bush bottom 16. An outlet is effected through a radial outlet bore 36 in the plug 20, which bore communicates with an outlet bore 38 in the pump housing 12.

A piston 40 of the piston pump of the invention is embodied as a composite part with a core 42 that is spray-coated on its circumference with a plastic lubricant jacket 44. With its lubricant jacket 44, the piston 40 is guided, slidingly displaceably in the axial direction, in the cylinder bore 10 or bush 14. The core 42 in the exemplary embodiment shown is of steel. Other materials, such as other metals or also ceramic can also be considered as material for the core 42.

An end face of the core 42 that is remote from the bush bottom 16 and protrudes out of the bush 14 is bare; that is, it is not covered with the lubricant jacket 44. This end face of the core 42 forms a slide face 46, with which the piston 40 is pressed by a piston restoring spring 48 against a circumference of an eccentric element 50, which can be driven to rotate by an electric motor and with which the piston 40 can be driven to execute an axially reciprocating stroke motion. The slide face 46 is embodied with low wear, by the use of a low-wear material for the core 42 or by hardening of the core 42.

The core 42, in terms of its shape, is a very easily made, essentially cylindrical part. The lubricant jacket 44 surrounds the circumference of the core 42 with a hollow-cylindrical portion 52, and on a face end of the core 42 remote from the eccentric element 50, the lubricant jacket continues on into the bush 14, thereby lengthening the core 42 or piston 40. The portion 54 of the lubricant jacket 44 that lengthens the piston 40 has a transverse bore 56, which penetrates an axial blind bore 58 that is likewise made in the portion 54 of the lubricant jacket 44 that lengthens the piston 40. The blind bore 58 widens, forming a conical valve seat 60, and discharges at a face end of the piston 40 toward the bush bottom 16. A check valve in the form of an inlet valve 62 is inserted into the widened portion of the blind bore 58 and has a valve ball 64 as its valve closing body, which is pressed against the valve seat 60 by a helical compression spring acting as the valve closing spring 66.

The valve closing spring 66 is braced on a valve cage 68, which is made on the face end of the piston 40 toward the bush bottom 16. The valve cage 68 takes the form of a valve cap 68 and is a plastic injection-molded part. The valve cage 68 has an annular washer 70, from which a centering collar 72 protrudes axially and engages the blind bore 58 in the piston 40 in the manner of a tight fit. The piston restoring spring 48 is braced against an inside of the bush bottom 16 and presses the valve cage 68, by its annular washer 70, against the face end of the piston 40. Via the annular washer 70, the piston restoring spring 48 presses the piston 40 against the circumference of the eccentric element 50.

On the side of the valve cage 68 remote from the centering collar 72, four ribs 74 protrude from the annular washer 70; they are joined in the middle and carry a pinlike valve stroke limiter 76 that is integral with them and protrudes toward the valve ball 64. The valve stroke limiter 76 defines the opening distance by which the valve ball 64 can be lifted away from the valve seat 60. The valve stroke limiter 76 lessens wearing of the valve seat 60 from strong impact of the valve ball 64 upon closure of the check valve and limits the valve closing time. The valve stroke limiter 76 also reduces an idle volume of the piston pump of the invention, that is, a residual volume that remains in a positive-displacement chamber 78 of the piston pump when the piston 40 is thrust to its terminal position into the bush 14. This lessening of the idle volume improves the efficiency of the piston pump.

The lubricant jacket 44 comprises a carbon fiber reinforced plastic, with which Teflon components are admixed to improve the sliding properties. The valve cap 68 is also of carbon fiber reinforced plastic, but preferably without any Teflon.

A graduation is formed onto the outer circumference of the lubricant jacket 44, on its end toward the valve cage 68. Once the valve cage 68 has been mounted on the piston 40, an annular groove is formed between this graduation of the lubricant jacket 44 and the valve washer 70 of the valve cage 68, and a sealing ring 79 can be placed in this annular groove. Because the sealing ring 79 can be placed in the annular groove before the piston 40 and the valve cage 68 are joined together, or in other words before the annular groove is closed on its face end, the assembly of these parts is very simple, and in particular the sealing ring 79 does not need to be stretched, or needs to be stretched over very insignificantly, during the assembly.

Because the lubricant jacket 44 comprises a soft material, preferably plastic, the guide gap between the inner jacket of the bush 14 and the lubricant jacket 44 can be made very narrow. The lubricant jacket 44 can even be installed with some prestressing in the inner jacket. The guide gap of the piston pump proposed here can be made substantially narrower than if no lubricant jacket were provided. Because of the narrow guide gap between the lubricant jacket 44 and the inner jacket of the guide bush 14, there is no danger that the sealing ring 79 will be squeezed by the high pressure in the positive-displacement chamber 78 into the guide gap between the lubricant jacket 44 and the bush 14.

Description of the Second Exemplary Embodiment

Figure 2:
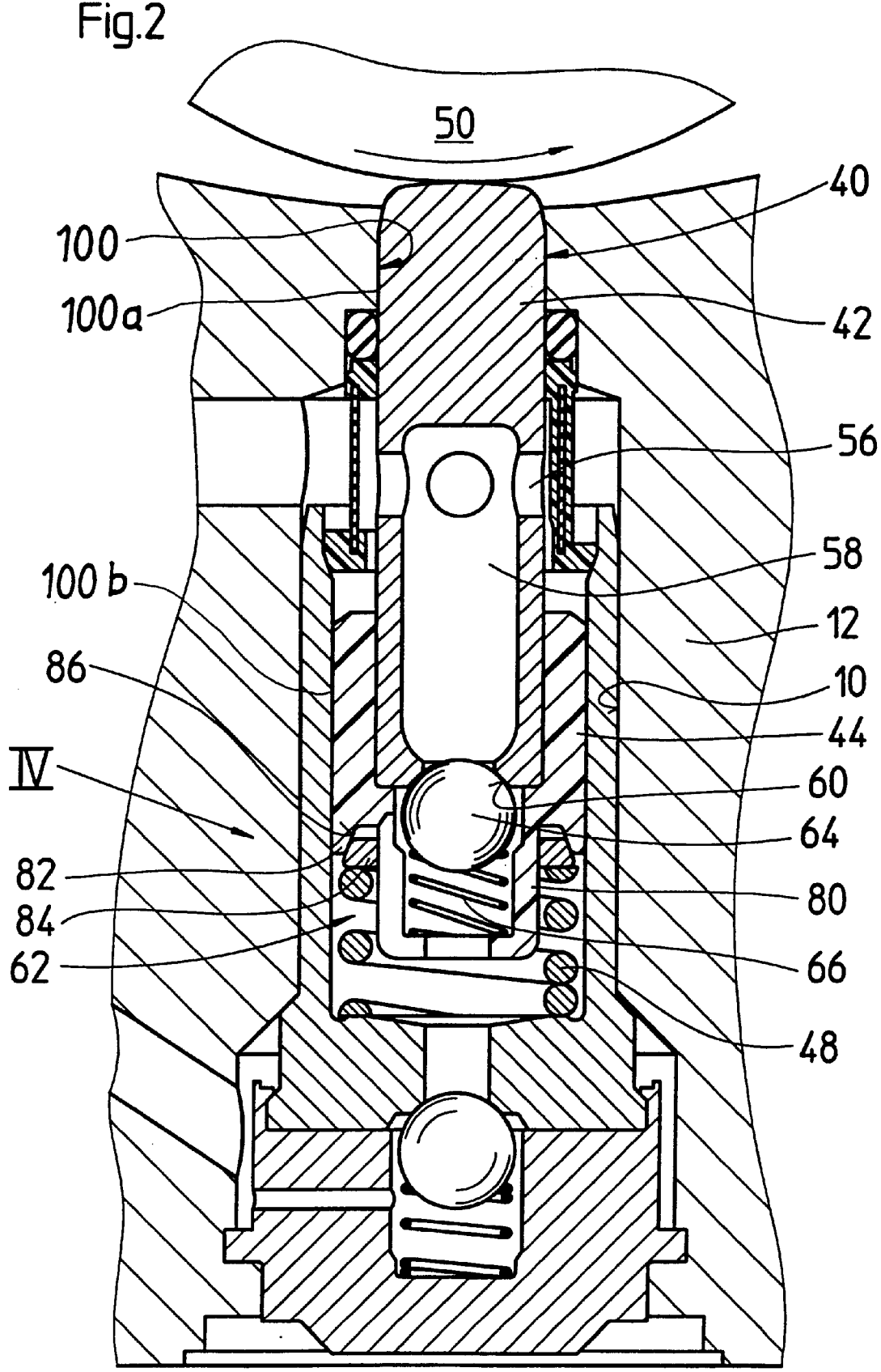
FIG. 2, an axial section through a second exemplary embodiment of the piston pump of the invention.

To avoid repetition, only the differences between the embodiment of a piston pump according to the invention as shown in FIG. 2 and the piston pump shown in FIG. 1 will be described; for the remainder, the remarks made in conjunction with FIG. 1 are referred to. Identical reference numerals are used for identical components.

The piston pump shown in FIG. 2 has a piston 40, whose core 42 is rodlike; the transverse bore 56 and the axial blind bore 58 are made in the core 42. The lubricant jacket 44 extends over only approximately one-third the length of the core 42, on a side of the core 42 that is received in the bush 14. Over the remainder of its length, the core 42 is not surrounded by the lubricant jacket 44. The circumference of the core 42 is bare over this length. On its end toward the eccentric element 50, the core 42 is guided directly in the cylinder bore 10 of the pump housing 12.

Unlike the first exemplary embodiment, in the exemplary embodiment shown in FIG. 2 the lubricant jacket 44 is joined integrally to a valve cage 68, which is formed, axially lengthening the core 42 or piston 40, on a face end of the core 42 or piston 40 oriented toward the bush bottom 16.

Even though in FIG. 2 the valve cage 68 is joined integrally to the lubricant jacket 44, the valve stroke limiter 76 shown in FIG. 1 can still be provided on the valve cage 68.

The inlet valve 62 is inserted into the valve cage 68, and its valve closing spring 66 is braced in the valve cage 80 and presses the valve ball 64 against the valve seat 60, which in the embodiment of a piston pump of the invention shown in FIG. 2 is embodied at an orifice of the blind bore 58 provided in the core 42.

The lubricant jacket 44 of the piston pump shown in FIG. 2 is embodied at the same time as a sealing element: To that end, it has a sealing lip 82 that is integral with the jacket 44 and extends around and that, as is known per se for cuff-type sealing rings, protrudes axially from the lubricant jacket 44 at its outer circumference and at the same time is elastically resiliently prestressed radially outward. The sealing lip 82 is pressed radially outward by a spreader ring 84 into sealing contact with an inner circumferential face of the bush 14. The spreader ring 84 has a conical spreader face 86, with which it rests on a likewise conical inside of the sealing lip 82 that corresponds to the spreader face 86. The spreader ring 84 is pressed axially against the sealing lip 82 by the piston restoring spring 48. A cone angle of the spreader face 86 determines the spreading force with which the sealing lip 82 is pressed radially outward against the inner circumferential face of the bush 14, in proportion to the axial force with which the piston restoring spring 48 presses the piston 40 against the circumference of the eccentric element 50.

The spreader ring 84 provides for the elastically resilient prestressing of the sealing lip 82 against the inner circumferential face of the bush 14. The spreader ring 84 has the advantage that for the lubricant jacket 44 it is also possible to use a material that is less suitable for maintaining elastic prestressing over long-term operation but on the other hand has especially good sliding properties, for instance. As a result, a material that is optimal with respect to both sliding properties and dimensional stability can be selected for the lubricant jacket 44, and despite this the lubricant jacket 44 can still perform a sealing function. The spreader ring 84 can be placed between the piston restoring spring 48 and the piston 40 without significant effort in the course of assembly of the piston pump.

The lubricant jacket 44 is slipped or press-fitted onto the core 42. However, the piston 20 can also be made in such a way that the core 42 is placed in a mold of a plastic injection molding machine, and the core 42 is then spray-coated with plastic so that the piston 20 can be given the intended final form in a very simple way.

In the piston pump of the invention shown in FIG. 3, the core 42 of the piston 40 has a thickening 88 on its face end toward the bush bottom 16. The thickening may be made by upsetting for instance. The thickening 88 has a face that extends conically toward the eccentric element 50. This face forms an undercut. The undercut acts as a retaining face 90, which is engaged from behind by spring prongs 92 of the lubricant jacket 44. The spring prongs 92 of the lubricant jacket 44 are formed by slitting the lubricant jacket 44 once or multiple times longitudinally in the region of its end toward the eccentric element 50. As a result, this end of the lubricant jacket 44 can easily be pushed past the thickening 88 until the spring springs 92 engage the retaining face 90 from behind. In this design of the invention, the lubricant jacket 44 is connected to the core 42 of the piston 40 in a kind of snap connection.

The snap connection between the core 42 and the lubricant jacket 44 can, however, also be embodied such that the thickening 88 is omitted, so that the core 42 has a continuous cylindrical form on its outer circumference that is interrupted, for instance at one point, by an annular plunge cut (not shown) which extends all the way around and is engaged by the spring prongs 92. In that case, the retaining face 90 is located on the side wall of the annular plunge cut, so that once the lubricant jacket 44 has been joined to the core 42, the spring prongs 92 of the lubricant jacket 44 engage the retaining face 90 from behind.

Otherwise, the piston pump shown in FIG. 3 is embodied in the same way as the piston pump shown in FIG. 2 and in this respect reference is made to the description of FIG. 2.

The embodiment of the invention shown in FIG. 4 has a sealing ring 94, which is separate from the lubricant jacket 44 and comprises an elastomer or plastic, instead of the sealing lip 82. The sealing ring 94 has a conical face 96 on one face end, which is pressed by the piston restoring spring 48 against a corresponding conical annular shoulder face 98 of the lubricant jacket 44. This causes a radial widening of the sealing ring 94, and the sealing ring 94 is pressed sealingly against the inner circumferential wall of the bush 14.

For mechanical protection for the sealing ring, a washer 99 (FIG. 4) is placed between the sealing ring 94 and the piston restoring spring 48. The contact face between the sealing ring 94 and the washer 99, in the preferably selected exemplary embodiment, extends perpendicular to the longitudinal axis of the piston 40. However, it is also possible to incline this contact face at an angle to the longitudinal axis of the piston 40 in such a way that as a result the piston restoring spring 48 generates a force component on the sealing ring 94 radially outward toward the inner face of the bush 14.

Otherwise, this embodiment of the invention is also embodied like the piston pump shown in FIG. 2, and to avoid repetition the description of FIG. 2 is referred to.

As the selected exemplary embodiments, shown in FIGS. 1–4 show, the piston 40 is guided axially movably on both of its ends inside a piston guide 100. For guiding the piston 40 in the piston guide 100, there is a first guide region 100a and a second guide region 100b. The first guide region 100a is located in the region of the end of the piston 40 toward the eccentric element 50, and the second guide region 100b is located in the region of the end of the piston 40 toward the positive-displacement chamber 78. In the exemplary embodiments preferably selected for the drawing, the piston 40 is guided in the guide region 100a directly in the pump housing 12, while in the guide region 100b the guidance of the piston 40 is effected along the inner circumference face of the bush 14. It should be noted that the bush 14 can also be lengthened so far in the direction of the eccentric element 50 that both in the guide region 100b and in the guide region 100a, the piston 40 is guided (not shown) inside the bush 14. However, it is also possible optionally to dispense with the bush 14, so that the piston 40 is then axially movably guided (not shown) without a bush, directly in the pump housing 12, in both the guide region 100a and the guide region 100b. As a result, the number of components required can be reduced. This is favored by the lubricant jacket 44, because even if the bush 14 is omitted the lubricant jacket can assure good, low-friction and durable guidance of the piston 40 directly in the pump housing 12.

It should be especially pointed out that the lubricant jacket 44 can be dimensioned such that the guidance of the piston 40, both in the guide region 100a and in the guide region 100b, is effected via the lubricant jacket 44 (FIG. 1). However, the lubricant jacket 44 can also be embodied such that the guidance of the piston 20 via the lubricant jacket 44 is effected only in the guide region 100b. That is, in the guide region 100a, the core 42 of the piston 40 is guided without a lubricant jacket directly in the pump housing 12 (FIGS. 2 and 3), or the core 42 is guided (not shown) directly in the bush 14 in the guide region 100a.

It should also be pointed out that the piston 40 can have the same diameter (FIG. 1) in both the guide region 100a and the guide region 100b. However, it is also possible to select the diameter of the piston 40 in the guide region 100b, for instance, as larger than in the guide region 100a (FIGS. 2 and 3). This lends the piston pump especially good aspiration performance. Because it is easily possible to lend the lubricant jacket 40 a desired shape and diameter, it takes no additional effort to select a larger diameter for the piston 40 in the guide region 100a than in the guide region 100b.

Without modifying the core 42, the piston 40 can be easily adapted to given needs by slight modification of the diameter of the lubricant jacket 44. In particular, as a result the piston 40 can easily be embodied as either a stepped piston or a piston with the same diameter throughout.

Even if the diameter of the piston 40 is larger in the guide region 100b than in the guide region 100a, it is very easily to produce the requisite surface quality of the piston 40 in the guide region 100a, because it is possible not to attach the lubricant jacket 44 to the core 42 until once the piston 40, in the guide region 100a, has been given the requisite high surface quality. It should be noted that is otherwise, in a graduated piston, machining the piston in a region of reduced diameter would necessitate especially great effort.

The foregoing relates to a preferred exemplary embodiment of the invention, it being understood that other variants and embodiments thereof are possible withing the spirit and scope of the invention, the latter being defined by the appended claims.

What is claimed is:

1. A piston pump of a vehicle brake system having a pump housing, a cylinder bore in said pump housing, a piston that is driven to execute an axially reciprocating stroke motion is displaceably guided in said pump housing, the piston (40) is a composite part, which has a core (42) that has a lubricant jacket (44) of plastic on its circumference, and in which the piston pump has a check valve (62) which is inserted into the lubricant jacket (44).

2. The piston pump according to claim 1, in which the core is spray-coated with the lubricant jacket (44).

3. The piston pump according to claim 1, in which the core (42) comprises a metal.

4. The piston pump according to claim 1, in which the core (42) comprises a ceramic.

5. The piston pump according to claim 1, in which a face end of the piston (40) oriented toward an eccentric element (50) that drives the piston (40) has a slide face (46) of a metal.

6. The piston pump according to claim 1, in which a face end of the piston (40) oriented toward an eccentric element (50) that drives the piston (40) has a slide face (46) of a ceramic.

7. The piston pump according to claim 1, in which an opening stroke of a valve closing body (64) of the check valve (62) is defined by a valve stroke limiter (76) mounted on the piston (40).

8. The piston pump according to claim 1, in which the lubricant jacket (44) is embodied as a sealing element.

9. The piston pump according to claim 8, in which the lubricant jacket (44) has a sealing lip (82) that extends around its circumference.

10. The piston pump according to claim 9, in which the piston (40) has a spreader ring (84) with a spreader face (86) extending all the way around, which face has an inclination to a radial plane, and that the piston pump has a spreader spring element (48), which presses the spreader ring (84) axially with said spreader face (86) against the sealing lip (82), so that the spreader ring (84) presses the sealing lip (82) radially outward against a circumferential wall of the cylinder bore.

11. A piston pump of a vehicle brake system having a pump housing, a cylinder bore in said pump housing, a piston that is driven to execute an axially reciprocating stroke motion is displaceably guided in said pump housing, the piston (40) is a composite part, which has a core (42) that has a lubricant jacket (44) of plastic on its circumference, and in which the lubricant jacket (44) engages a retaining face (90), provided on the piston (40) from behind.

12. The piston pump according to claim 11, in which the core is spray-coated with the lubricant jacket (44).

13. The piston pump according to claim 11, in which the core (42) comprises a metal.

14. The piston pump according to claim 11, in which the core (42) comprises a ceramic.

15. The piston pump according to claim 11, in which a face end of the piston (40) oriented toward an eccentric element (50) that drives the piston (40) has a slide face (46) of a metal.

16. The piston pump according to claim 11, in which a face end of the piston (40) oriented toward an eccentric element (50) that drives the piston (40) has a slide face (46) of a ceramic.

17. The piston pump according to claim 11, in which the piston pump has a check valve (62), which is integrated with the piston (40), and an opening stroke of a valve closing body (64) of the check valve (62) is defined by a valve stroke limiter (76) mounted on the piston (40).

18. The piston pump according to claim 11, in which the lubricant jacket (44) is embodied as a sealing element.

19. The piston pump according to claim 18, in which the lubricant jacket (44) has a sealing lip (82) that extends around its circumference.

20. The piston pump according to claim 19, in which the piston (40) has a spreader ring (84) with a spreader face (86) extending all the way around, which face has an inclination to a radial plane, and that the piston pump has a spreader spring element (48), which presses the spreader ring (89) axially with said spreader face (86) against the sealing lip (82), so that the spreader ring (84) presses the sealing lip (82) radially outward against a circumferential wall of the cylinder bore.

* * * * *